United States Patent Office 3,075,997
Patented Jan. 29, 1963

3,075,997
3,5-DIHYDROXY-3-FLUORO-METHYLPENTANOIC ACID AND THE DELTA LACTONE THEREOF
Rudolf Tschesche, Roettgen, near Bonn, Hans Machleidt, Bonn, and Theodor Bucher, Marburg (Lahn), Germany, assignors to Olin Mathieson Chemical Corporation, New York, N.Y., a corporation of Virginia
No Drawing. Filed Oct. 24, 1961, Ser. No. 147,165
4 Claims. (Cl. 260—343.5)

This application is a continuation-in-part of our co-pending application Serial No. 814,408, filed May 20, 1959, now abandoned.

This invention relates to, and has for its object the provision of new chemical compounds which possess physiological activity. More particularly, this invention relates to fluoromevalonic acid, its lactone and its salts and to the preparation thereof.

Fluoromevalonic acid, i.e. 3,5-dihydroxy-3-fluoro-methylpentanoic acid, its delta lactone and salts thereof have been found to be physiologically active substances which possesses hypocholesteremic activity. Thus, they are effective agents for the inhibition of cholesterol bio-synthesis and regulating the level of cholesterol in the blood and are useful for the treatment of atherosclerosis or other diseases or disorders caused or compounded by an excess of cholesterol in the blood. The products of this invention may be administered orally or paren-terally by incorporating adequate dosages of the fluoro-mevalonic acid, its lactone or non-toxic, pharmacolog-ically acceptable salts in conventional dosage forms such as tablets, capsules, suspensions, injectables or the like.

Fluoromevalonic acid is prepared by a process which comprises condensing allyl magnesium bromide with fluoroacetic acid ethyl ester, converting the fluoromethyl-diallyl carbinol thus formed into β-hydroxy-β-fluorometh-yl glutaric acid, esterifying the acid to obtain the di-methyl ester and reducing the ester to the desired 3,5-dihydroxy-3-fluoromethylpentanoic acid. The acid is then readily convertible to the delta lactone according to conventional procedures, e.g. by treating with water under acid conditions or first forming a water soluble salt, then following the same procedure. A strong acid, e.g. a mineral acid such as sulfuric or hydrochloric acid, may be used.

The delta lactone has the structure

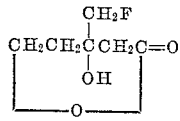

Water-soluble salts of fluoromevalonic acid are ob-tained by neutralization with inorganic bases such as al-kali metal or alkaline earth metal hydroxides, e.g. so-dium hydroxide, potassium hydroxide or the like, and ammonium hydroxide; and inorganic bases such as the primary, secondary and tertiary amines and alkanol-amines. Representative examples of suitable organic bases are methylamine, dimethylamine, triethylamine, triethanolamine and piperidine. Alkali metal salts, especially the sodium salt, are preferred.

The invention is more fully illustrated by the follow-ing detailed example which is for illustration only and is not to be construed as limiting in any way the scope of the present invention.

EXAMPLE I 3,5-Dihydroxy-3-Fluoromethyl-Pentanoic Acid (a) FLUOROMETHYL-DIALLYL-CARBINOL 140 grams of allyl bromide are added dropwise to 95 grams of magnesium borings in 700 cc. of absolute ether. To 680 cc. of this solution there is added, while maintaining the temperature at −40 to −30° C., a so-lution of 40 grams of fluoracetic acid ethyl ester in 150 cc. of absolute tetrahydrofuran. After termination of the reaction, the reaction mixture is stirred for 15 min-utes at room temperature and then treated with cold dilute sulfuric acid. The aqueous phase is extracted twice with 200 cc. of chloroform. The chloroform ex-tracts are combined, washed with sodium bicarbonate solution, dried over magnesium sulfate and then con-centrated in vacuo. The residue is fractionated under vacuum, yielding 43.1 gm. (55% of theory) of the de-sired product, a colorless oil, B.P.$_{12}$=59° C.

Analysis.—Calculated for $C_8H_{13}FO$ (144): C, 66.64; H, 9.10. Found: C, 66.55; H, 9.03.

(b) β-HYDROXY-β-FLUOROMETHYL-GLUTARIC ACID 7.70 grams of fluoromethyl-diallyl-carbinol is dissolved in a solution of 250 cc. of methylene chloride and 15 cc. of glacial acetic acid and treated with ozone at −70° C. until an intense blue color is obtained. The reaction mixture is brought to room temperature and treated with 300 cc. of glacial acetic acid. The methylene chlo-ride is then distilled off in vacuo. Following this, 60 cc. of 30% hydrogen peroxide and 40 cc. of 1 N sul-furic acid are added and the reaction mixture is refluxed for 12 hours. It is then diluted with 200 cc. of water, treated with an excess of barium carbonate, filtered and concentrated in vacuo. The concentrate is passed through a column of Dowex 50 H+ resin. The filtrate is then steam-heated under vacuum. The residue, a colorless syrupy liquid, is dried at 50° C. and about 0.05 mm. Hg for a period of 30 minutes. After stand-ing for a day, the product crystallizes, yielding 7.55 g. of β-hydroxy-β-fluoromethylglutaric acid; $R_f$=0.16, in a system comprising n-propanol, n-butanol and concen-trated ammonia water (1:2) in the proportions 60:20:30.

(c) β-HYDROXY-β-FLUOROMETHYL-GLUTARIC ACID-DIMETHYL ESTER

The β-hydroxy-β-fluoromethyl-glutaric acid obtained above is added to a mixture of 221 cc. of methanol and 5.0 cc. of concentrated sulfuric acid and the resultant solution allowed to stand at room temperature for 48 hours. At the end of this period the methanol solution is added with stirring to a solution of 18 gm. of KHCO$_3$ in 300 cc. of water. The methyl ester is recovered by extracting with three 150 cc. portions of chloroform. The extracts are combined, washed with water, dried over magnesium sulfate and concentrated in vacuo. The residue is fractionated under vacuum, yielding 8.85 gm. (80% of theory) of the desired product, a colorless oil, B.P.$_{0.05}$=50° C.

Analysis.—Calculated for $C_8H_{13}FO_5$ (208.2): C, 46.17; H, 6.28. Found: C, 45.95; H, 6.36.

(d) 3,5-DIHYDROXY-3-FLUOROMETHYLPENTANOIC ACID 4.236 gm. of β-hydroxy-β-fluoromethyl-glutaric acid dimethyl ester is dissolved in 20 cc. of absolute tetrahy-drofuran and 20 cc. of absolute ether. To this solution there is added at 0° C., with continuing agitation and over a period of 30 minutes, 26.0 cc. of a solution of 0.55 mm. of LiAlH$_4$ in ether. At the completion of the reaction, 40 cc. of water and 200 mg. of sodium boro-hydride are added and the mixture is agitated at 20° C. for a period of 8 hours. The reaction mixture is then acidified with 40 cc. of 2 N sulfuric acid and allowed to stand overnight. After the addition of ammonium sulfate, the reaction mixture is extracted with ether. The ether is distilled off under vacuum, leaving 2.49 gm. of a colorless oil. The product is distilled three times with 10 cc. portions of methanol to remove any boric acid present. After drying at 0.05 mm. Hg the product is taken up in 6 cc. of water-saturated chloroform and chromatographed on 70 gm. of Celite 535 using 0.1 N sulfuric acid as stationary phase and water-saturated chloroform as the mobile phases. 15 cc. fractions were collected starting with number 1. The fraction 12–14 contains 111 mg. of a neutral compound (3-hydroxy-3-fluoromethylpentane - 1,5 - diol). Fraction 47–66 comprises 1.49 gm. of fluoromevalonic acid that had a paper chromatogram of $R_f=0.42$ in the system comprising n-propanol, n-butanol and concentrated ammonia water (1:2) in the proportions of 60:20:30.

The free acid is purified by conversion to the N,N'-dibenzylethylenediammonium salt. This salt can then be readily reconverted to the dihydroxy acid by hydrolysis. Conversion to the N,N'-dibenzylethylenediammonium salt is carried out according to the following procedure:

1.49 gm. of 3,5-dihydroxy-3-fluoromethylpentanoic acid is treated with 75.0 cc. of 0.196 N-barium hydroxide and the resultant solution permitted to stand for 4 hours at room temperature. Neutralization with 0.1 N sulfuric acid required 45.5 cc. (10.1 nMol.). A warm solution of 10.1 nMol. of N,N'-dibenbylethylenediammonium sulfate dihydrate (1.89 gm.) in 150 cc. of water is added to the above solution. The precipitated barium sulfate is removed, the solution filtered through activated charcoal and the resulting filtrate steamed under vacuum. There is obtained a crystalline residue which is dried in vacuum and then dissolved in ethylacetate in the presence of a little methanol. This solution is then filtered and cooled. Upon cooling, colorless needles formed which are removed by filtration. The crystals are washed with ethyl acetate and dried, yielding 1.46 gm. of product, M.P. 108–109° C. Upon recrystallization from methanol+ethyl acetate 1.04 gm. of colorless needles, M.P. 111–112° C. are obtained.

*Analysis.*—Calculated for $C_{28}H_{42}F_2N_2O_8$ (512.6): C, 58.71; H, 7.39. Found: C, 58.39; H, 7.47.

The invention may be variously otherwise embodied within the scope of the appended claims.

What is claimed is:

1. A compound selected from the group consisting of 3,5-dihydroxy-3-fluoromethylpentanoic acid, the delta lactone of 3,5-dihydroxy-3-fluoromethylpentanoic acid and a pharmacologically acceptable salt of 3,5-dihydroxy-3-fluoromethylpentanoic acid.

2. 3,5-dihydroxy-3-fluoromethylpentanoic acid.

3. The delta lactone of 3,5-dihydroxy-3-fluoromethylpentanoic acid.

4. An alkali metal salt of 3,5-dihydroxy-3-fluoromethylpentanoic acid.

References Cited in the file of this patent

UNITED STATES PATENTS

| | | |
|---|---|---|
| 2,485,100 | Ladd et al. | Oct. 18, 1949 |
| 2,915,398 | Wright et al. | Dec. 1, 1959 |

OTHER REFERENCES

Singer et al.: Proc. Soc. Exp. Biol. and Med., volume 102 (November 1959, pages 370–373. QD 1 S8).